US011877985B2

(12) United States Patent
White

(10) Patent No.: US 11,877,985 B2
(45) Date of Patent: Jan. 23, 2024

(54) COMPARTMENTALIZED NURSING BOTTLE FOR INFANTS

(71) Applicant: Sophia L White, Fayetteville, GA (US)

(72) Inventor: Sophia L White, Fayetteville, GA (US)

( * ) Notice: Subject to any disclaimer, the term of this patent is extended or adjusted under 35 U.S.C. 154(b) by 27 days.

(21) Appl. No.: 17/520,360

(22) Filed: Nov. 5, 2021

(65) Prior Publication Data

US 2023/0142527 A1 May 11, 2023

Related U.S. Application Data

(60) Provisional application No. 63/111,342, filed on Nov. 9, 2020.

(51) Int. Cl.

| | |
|---|---|
| ***A61J 9/00*** | (2006.01) |
| ***A61J 9/04*** | (2006.01) |
| ***A61J 9/08*** | (2006.01) |
| *B65D 81/32* | (2006.01) |

(52) U.S. Cl.

CPC ............... *A61J 9/008* (2013.01); *A61J 9/085* (2013.01); *B65D 81/3205* (2013.01)

(58) Field of Classification Search

CPC .......... A61J 9/008; A61J 9/085; A61J 1/2093; A61J 1/2089; B65D 43/12; B65D 21/0231; B65D 21/0228; B65D 81/3205; B65D 81/3211; B65D 83/06; B01F 21/15; B01F 35/7163; B01F 35/7164

USPC ................ 215/11.1, DIG. 8; 220/200, 345.1; 222/129, 142.9, 142.6

See application file for complete search history.

(56) References Cited

U.S. PATENT DOCUMENTS 2,514,573 A * 7/1950 Harrison ................ G03B 17/12 206/508
2,628,913 A * 2/1953 Horan ................ B65D 77/0486 426/108
2,843,281 A * 7/1958 Gallois .................. A61J 11/045 215/11.1
3,144,152 A * 8/1964 Kopp ...................... A47J 47/04 220/916
3,223,297 A * 12/1965 Nyden ................. B65D 47/286 222/545
3,332,586 A * 7/1967 Amburgey ........... B65D 47/286 222/561
4,691,821 A * 9/1987 Hofmann ................ G01F 11/22 206/229

(Continued)

*Primary Examiner* — Gideon R Weinerth
(74) *Attorney, Agent, or Firm* — J.T. Hollin Attorney at Law, P.C.

(57) ABSTRACT

Disclosed is an infant feeding bottle having a means of mixing powdered baby formula, or other substance, at individually separate times, within any of multiple internal chambers which may be filled with water or other liquid. A user operates the device by removing one of a plurality of attached powder dispensers and pouring its contents, through an open loading portal, directly into one of the chambers within a cylinder main body. A canister top is fabricated with an off-center nipple and, when secured to the cylinder main body, prevents spillage of contents of the chambers. The user selects and detaches one of the plurality of powder dispensers, combines its contents with water or other liquid in a selected chamber, mixes thoroughly, and dispenses to an infant, as necessary. Thus, there are provided multiple uses of the same bottle at different times.

2 Claims, 6 Drawing Sheets

(56) References Cited

U.S. PATENT DOCUMENTS 4,779,722 A * 10/1988 Hall .................... B65D 55/06
215/DIG. 8
D350,460 S * 9/1994 Picozza .................... D9/504
5,673,789 A * 10/1997 Degraff-Eugene ....................
A47G 19/2288
206/217
5,697,533 A * 12/1997 Shahbazian .......... B65D 47/286
222/561
5,758,786 A * 6/1998 John .................... A61J 11/045
215/11.4
5,845,816 A * 12/1998 Krane .................... B65D 25/04
222/480
5,890,627 A * 4/1999 Storey .................. B65D 47/265
222/129
5,938,053 A * 8/1999 Verbovszky ....... A47G 19/2272
215/11.4
6,257,428 B1 7/2001 Caola
7,036,975 B2 5/2006 Renz
7,150,369 B1 * 12/2006 Fryar .................... A61J 9/00
215/11.4
7,377,383 B2 * 5/2008 Henry ................ B65D 81/3211
220/4.27
8,146,758 B1 * 4/2012 Peres .................... A61J 9/008
215/11.1
8,147,120 B2 * 4/2012 Renna .................... A47J 43/27
215/DIG. 8
D686,885 S * 7/2013 Meyers .................. G01F 11/22
D7/629
9,050,242 B1 6/2015 Mooney
9,120,598 B2 * 9/2015 Meyers ................ B65D 21/022
9,289,356 B2 * 3/2016 Farber .................... A61J 11/008
9,492,024 B2 * 11/2016 Sorensen ........... A47G 19/2205
9,629,782 B2 * 4/2017 Hayes .................... A61J 11/002
D787,886 S * 5/2017 Cerasani .................... D7/532
9,770,392 B2 9/2017 Wesley
10,085,919 B2 10/2018 Renz et al.
10,173,825 B1 * 1/2019 Ercole ................ B65D 81/3205
10,364,089 B2 * 7/2019 Daniels, Jr. ............ B65D 25/20
11,203,480 B2 * 12/2021 Zhang .................... B65D 85/72
11,242,236 B2 * 2/2022 LaBarbera ............ B01F 35/883
11,510,848 B2 * 11/2022 Touati .................... A23C 9/18
11,627,838 B1 * 4/2023 Litman ................. B01F 35/883
222/145.5
2006/0226035 A1 * 10/2006 Smith .................... B65D 25/08
206/219
2007/0246467 A1 * 10/2007 Kneer .................... B65D 39/16
220/254.9
2008/0156763 A1 * 7/2008 Murphy .................... A61J 9/00
215/11.1
2009/0178940 A1 * 7/2009 Said .................... A61J 9/00
215/11.1
2009/0188884 A1 * 7/2009 Nelson .................... A61J 9/008
215/6
2012/0067875 A1 * 3/2012 Chiang .................... A61J 9/00
62/3.1
2012/0193317 A1 * 8/2012 Brown .................... A61J 9/00
215/6
2014/0061145 A1 * 3/2014 Harris .................... A61J 9/008
215/6
2014/0091086 A1 * 4/2014 Sorensen ............. B65D 21/022
215/11.1
2014/0102918 A1 * 4/2014 Eitrheim ............... A61J 1/2093
206/219
2015/0050405 A1 * 2/2015 Trager .................... C12G 3/04
426/519
2015/0283038 A1 * 10/2015 Abou-Odah ........... A61J 11/008
215/11.1
2016/0066749 A1 * 3/2016 Trager .................. B65D 25/08
206/222
2016/0123786 A1 * 5/2016 Hanna .................... B65D 51/18
220/254.2
2016/0137386 A1 * 5/2016 Pontes García ........ B65B 29/10
53/474
2016/0270600 A1 * 9/2016 Pappas .................... A47J 43/27
2017/0000295 A1 * 1/2017 Hanna .................... A47J 47/04
2017/0105581 A1 * 4/2017 Enghard ................ B65D 41/04
2017/0361985 A1 * 12/2017 Kaminkow ............ B65D 43/02
2018/0086519 A1 * 3/2018 Giuliano ............ B65D 51/2878
2021/0085566 A1 * 3/2021 Keenan ................... B01F 21/15
2023/0142527 A1 * 5/2023 L. White ................. A61J 9/008
215/11.1

* cited by examiner

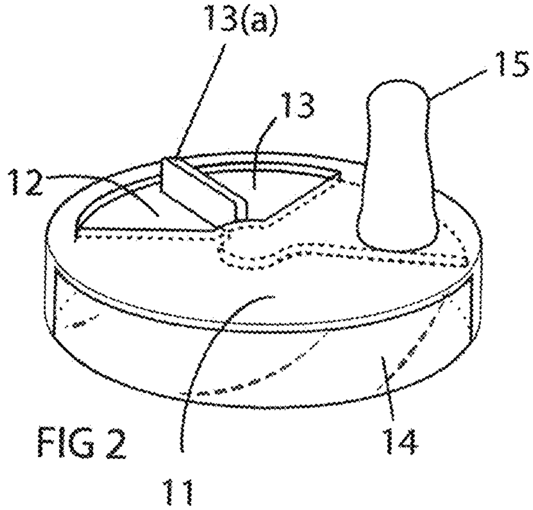
FIG 2
FIG 3
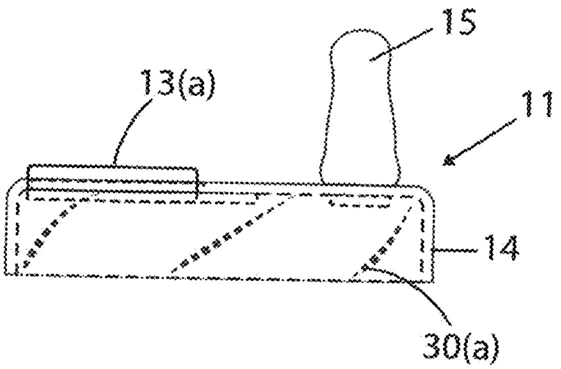
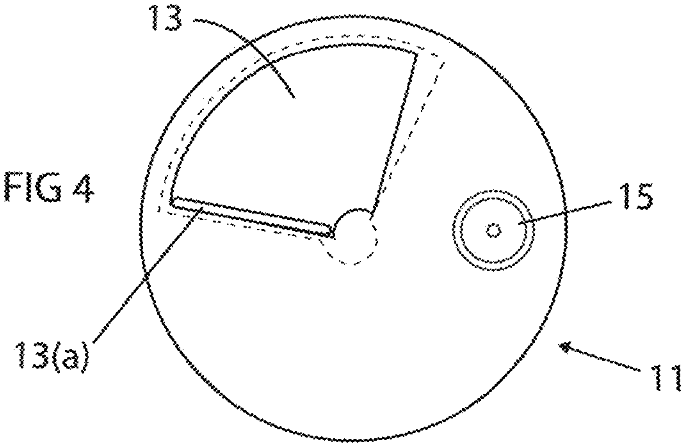
FIG 4
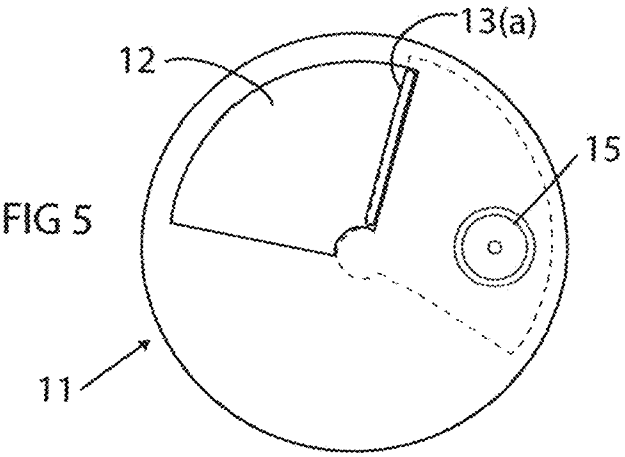
FIG 5

FIG 6
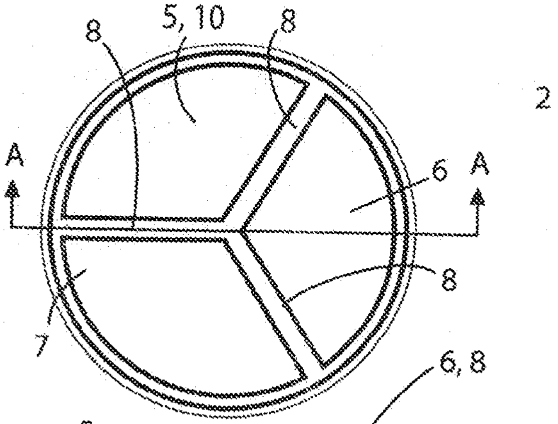
FIG 8
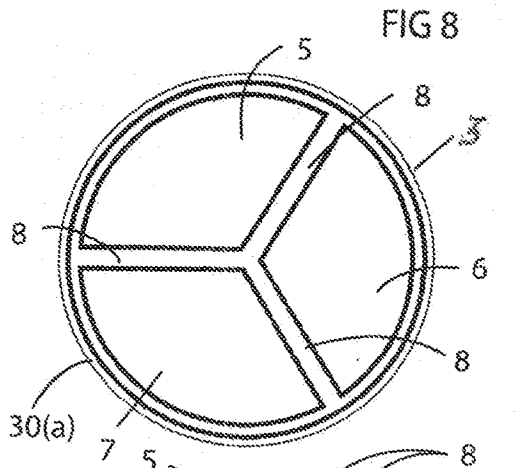
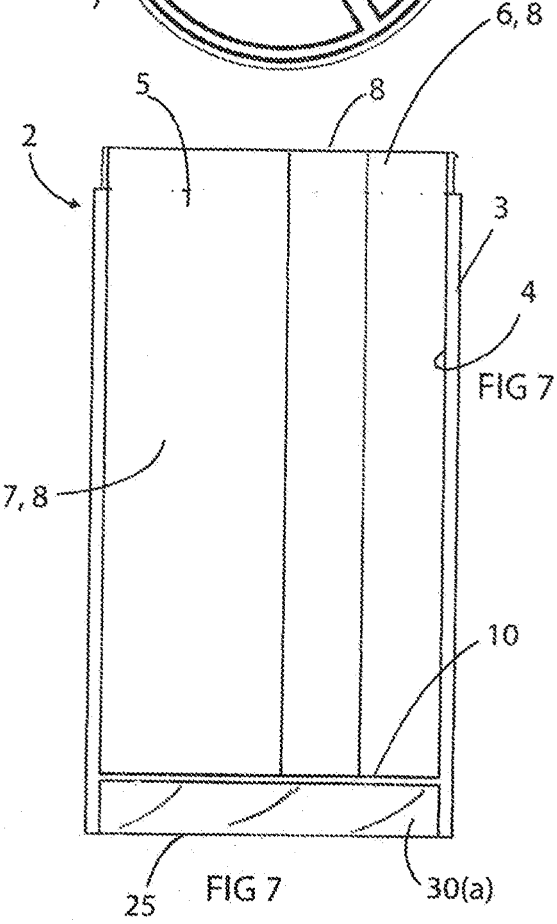
FIG 7
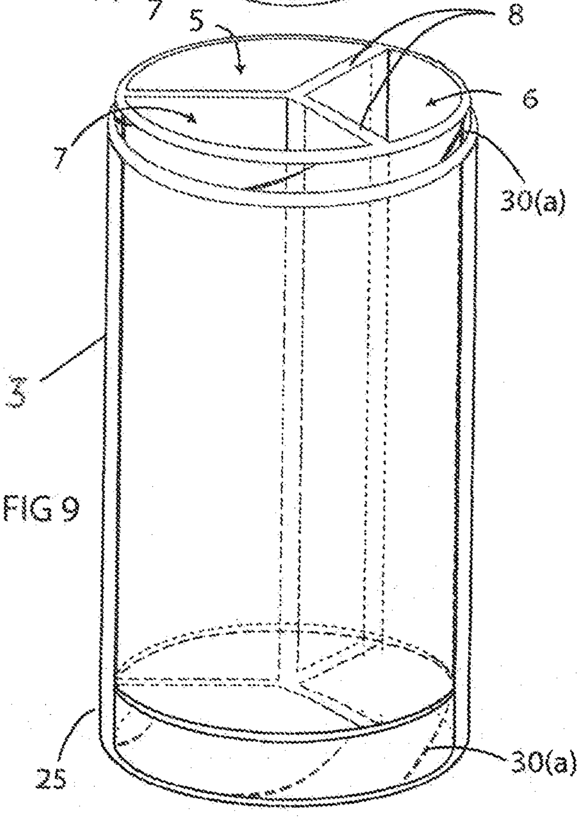
FIG 9

FIG 16
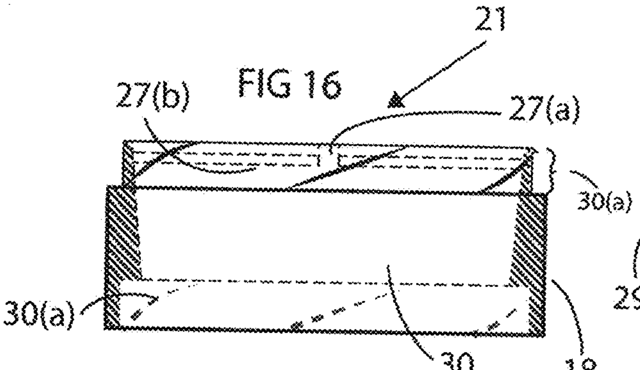
FIG 16A
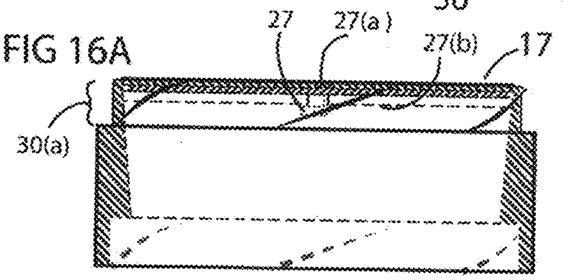
FIG 18
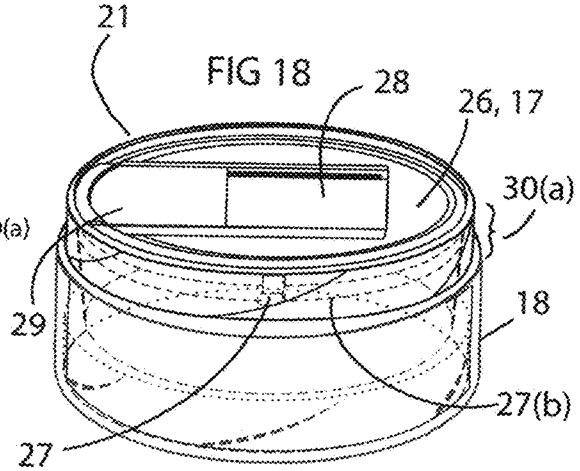
FIG 19
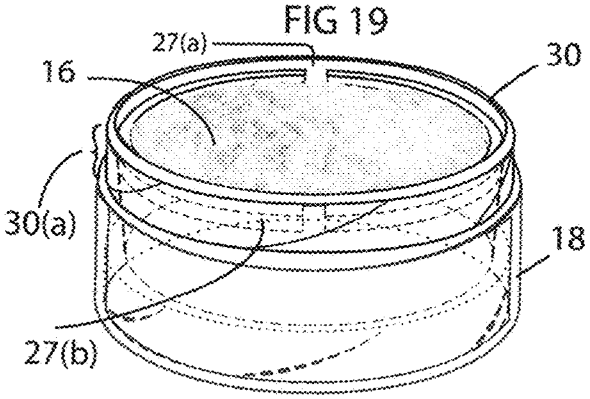
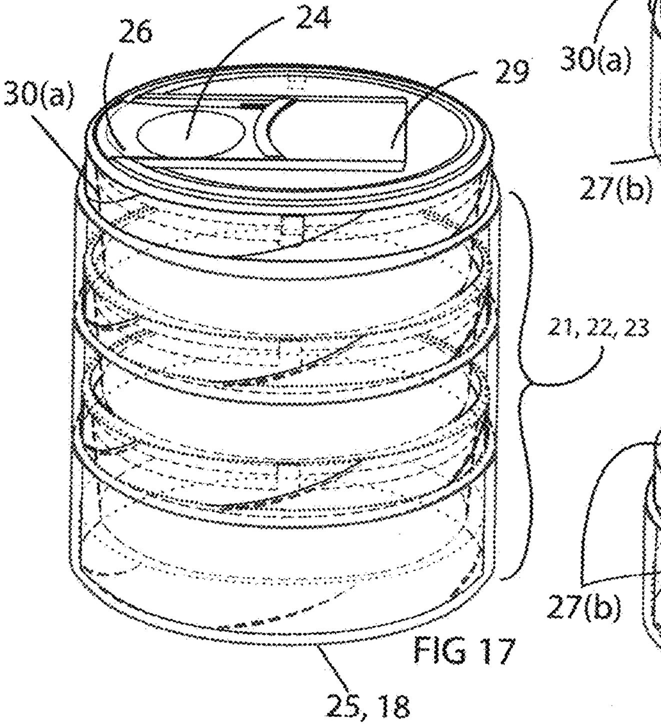
FIG 17
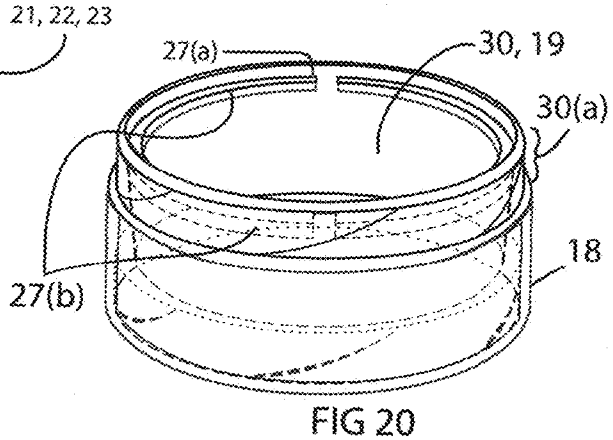
FIG 20

COMPARTMENTALIZED NURSING BOTTLE FOR INFANTS

CROSS-REFERENCES TO RELATED APPLICATIONS

This application claims the benefit of priority from previously-filed U.S. Provisional patent application, Ser. No. 63/111,342, filed on Nov. 9, 2020 and further, claims the benefit of content of said provisional patent application as though fully appearing herein.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

(1) Field of the Invention

The present invention relates to baby bottles and feeder bottles condensed into one bottle with formula/powder dispensers attached to simplify a mother's preparation process for the child. More particularly, the invention relates to a chambered bottle that is capable of storing the equivalent of three bottles of nourishment inside of one bottle.

The field of the present inventive concept relates generally to methods and equipment utilized for the storage, mixing, and dispensing of materials for infant feeding. More specifically, disclosed is an infant feeding bottle having a means to keep powdered formula or other substance, and water separated until the mixture of the two is ready to be consumed, at which time it can be mixed in the same bottle and dispensed as desired.

(2) Description of the Related Art, Including Information Disclosed Under 37 CFR 1.97 and 1.98.

U.S. Pat. No. 10,085,919; Renz, et al. Oct. 2, 2018; bottle feeding device, including a bottom piece of a bottle body having a first perimeter wall and a top piece of a bottle body having a second perimeter wall. The top piece is pivotally affixed to the bottom piece and is rotatable with respect to the bottom piece about an axis extending generally orthogonally through the first perimeter wall and the second perimeter wall. A pair of detent feature is provided to restrain the bottom piece and the top piece into either a first relative rotational position or a second relative rotational position. A nipple is operatively affixed to the top piece of the bottle by a nipple ring threaded onto the top piece of the bottle. A method of feeding an infant and of manufacturing the bottle are also provided.

U.S. Pat. No. 9,770,392; Wesley, Sep. 26, 2017; A container with a divider designed to hold two liquids separately inside. A cap on the container includes a twist mechanism that permits separate access to one side or the other side of the container without mixing the two materials within the container. The container can have installed infant holding handles. These handles are used to equal out the bottle weight, and are small enough for an infant to grab and hold. Instead of making two bottles to hold each liquid, one bottle can support two separate liquids.

U.S. Pat. No. 9,050,242; Mooney, et al Jun. 9, 2015; An infant bottle cap provides a means for storing powdered infant formula which is then installed upon a conventional baby bottle. The device comprises a cap attachment which attaches to the bottle and an internal cavity which separates the nipple from the powdered formula. The cap attachment is hollow, allowing for the storage of formula inside said cap. The top surface of the cap further comprises a hinged and latching lid for filling the cap with powdered formula and pouring the formula into water within the bottle when ready for use.

U.S. Pat. No. 7,036,975 B2; Renz May 2, 2006 There is provided an infant feeding bottle system having an agitator for mixing a powder substance with a liquid in a non-rigid disposable liner. The bottle system permits a user to mix powdered formula directly inside a non-rigid liner. The bottle system enhances the mixing effect, resulting in improved solubility, and provides for a self-contained uninterrupted mixing and feeding process.

U.S. Pat. No. 6,257,428; Caola; Jul. 10, 2001 A reusable insert designed for off-the-shelf covered containers, such as infant feeding bottle having a storage chamber for powdered formula, a top opening (32) to the chamber, a bottom opening (36) to the chamber, closure (40) for closing the bottom opening (35), and an actuator (20) that is guided for vertical movement within the housing for operative engagement with the closure. The upper end of the actuator extends below the nipple which is attached to the infant feeding bottle so that the user can apply downward pressure on the actuator through the nipple. Downward movement of the actuator causes the closure to move from its upper closed position at the bottom opening to a lower open position spaced from the bottom opening of the housing to enable powdered formula to be released into the chamber of the infant feeding bottle.

BRIEF SUMMARY OF THE INVENTION

The disclosed inventive concept is a compartmentalized nursing bottle, referred to as EZ Bottle 1, is a bottle, essentially constructed as a cylinder main body 2 having a plurality of lengthwise, equally-sized internal chambers 5, 6, 7. The separate chambers 5, 6, 7 enable a user to prepare, simultaneously or successively, three separate combinations of baby formula or other liquid stored within the EZ Bottle 1. In the preferred embodiment, the EZ Bottle 1 is disclosed with three equal-volume chambers 5, 6, 7, and a plurality of compatibly-sized, attachable powder dispensers 21, 22, 23.

A detachable circular canister top 11 is used for attachment to the topmost perimeter of the cylinder main bottle 2, thereby preventing spillage of the contents of the EZ Bottle 1. A canister top 11 features a closeable loading portal 12 which, when opened, allows substances from one or more of the powder dispensers 21, 22, 23 to be inserted into one of the chambers 5, 6, 7 of the cylinder main body 2.

The powder dispensers 21, 22.23 are cup-like, cylindrical containers, each fabricated with a means of attachment of one or more of the powder dispensers 21, 22, 23 onto the lower section of the cylinder main body 2. Further, the same means of attachment integral to the powder dispensers 21, 22, 23 is utilized for attachment of the powder dispensers 21, 22, 23, one to the other, in a vertically-stacked configuration.

BRIEF DESCRIPTION OF THE VIEWS OF DRAWINGS AS EXEMPLARY EMBODIMENTS OF THE INVENTIVE CONCEPT

The drawings of the inventive concept include FIG. 1 through FIG. 21.

FIG. 1 displays an exploded view of the entirety of the EZ Bottle 1, further showing the canister top 11, the cylinder main bottle 2, and an exemplary upper powder dispenser 21, typical of the design of multiple powder dispensers 21, 22, 23.

FIG. 2 displays a stand-alone, perspective rendering of the canister top 11 with a shutter 13 positioned to place a loading portal 12 in a partially open position.

FIG. 3 illustrates a side view of the canister top 11, further showing a nipple 15 and a shutter ridge 13(*a*).

FIG. 4 is a top view of the canister top 11, indicating the shutter 13 of the loading portal 12 having been placed in the full closed position.

FIG. 5 is a top view of the canister top 11, illustrating the shutter 13 (hidden from view) of the loading portal 12 having been placed in the fully open position.

FIG. 6 depicts a view looking vertically downward into an embodiment of the cylinder main body 2 of the inventive concept, further showing three dividers 8 which form a first chamber 5, a second chamber 6, and a third chamber 7 of the cylinder main body 2. FIG. 6 further is modified by insertion of a section line A-A.

FIG. 7 is a cross-sectional view of an embodiment of the cylinder main body 2 as obtained by viewing the cylinder main body 2 in the direction indicated by section line A-A.

FIG. 8 is a top view looking vertically downward upon a slightly different embodiment of the cylinder main body 2.

FIG. 9 is a lengthwise, perspective view of the cylinder main body 2 showing the three chambers 5, 6, 7, and exterior threads 30(*a*) around the uppermost perimeter of the cylinder main body 2.

Figure 10:
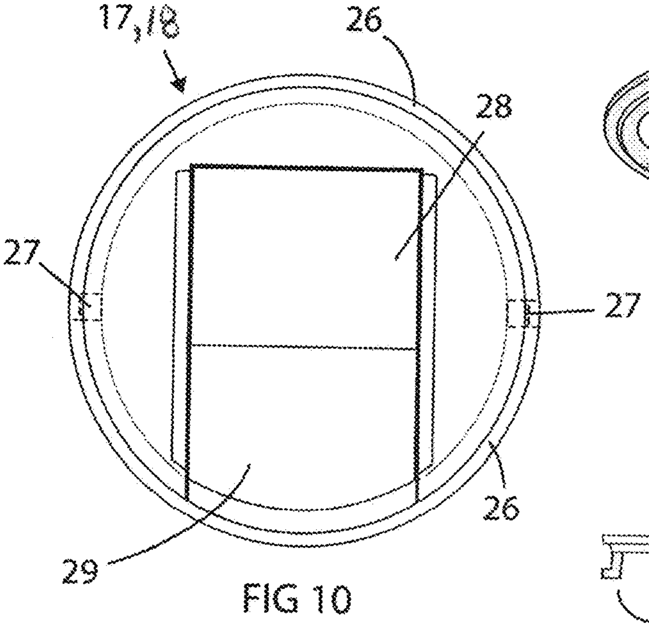

FIG. 10 presents an illustration of the upper surface of a powder dispenser lid 17, which is a component of each the upper powder dispenser 21, the center powder dispenser 22, and the lower powder dispenser 23. Further shown is an integral sliding hatch 29 in the closed position.

Figure 11:
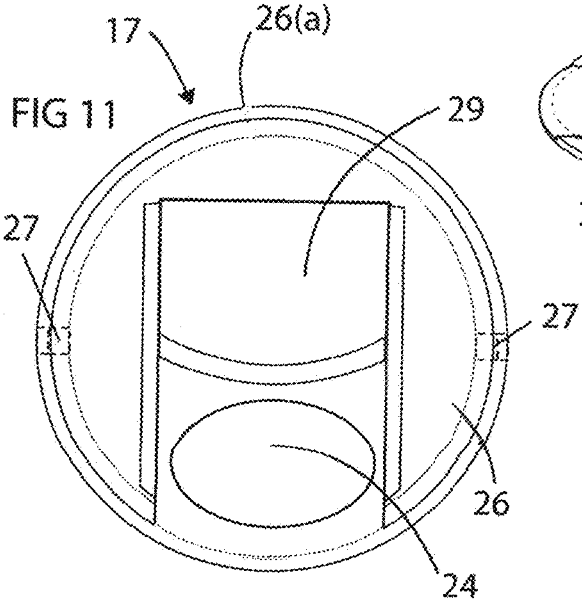

FIG. 11 illustrates a view of the upper surface of the powder dispenser lid 17 of FIG. 10, further showing the sliding hatch 29 in its open position, revealing an open powder dispenser spout 24.

Figure 12:
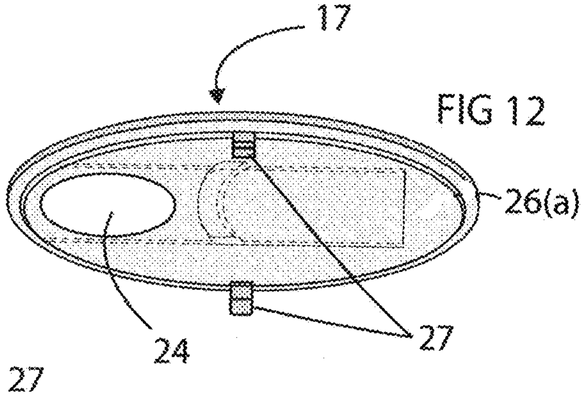

FIG. 12 depicts an upward-looking perspective view of the undersurface of the powder dispenser lid 17 of FIG. 11, further, showing latches 27 utilized in securing the dispenser lid 17 to any of the powder dispensers 21, 22, 23.

Figure 13:
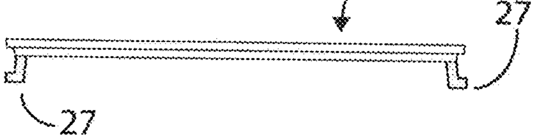

FIG. 13 is a side view of the powder dispenser lid 17, further showing two oppositely-spaced latches 27 for engagement of the lid 17 with an interior flange 27(*b*) of any of the powder dispensers 21, 22, 23.

Figure 14:
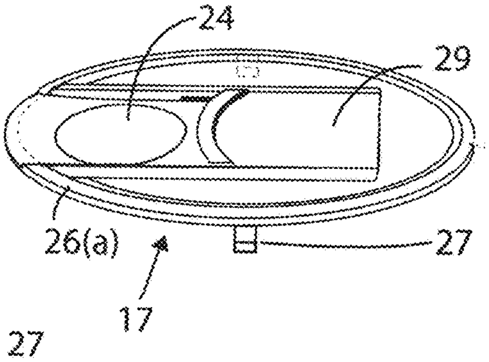

FIG. 14 presents a perspective view of the powder dispenser lid 17 of FIG. 11, showing the lid 29 in the open position with the powder dispenser spout 24 visible.

Figure 15:
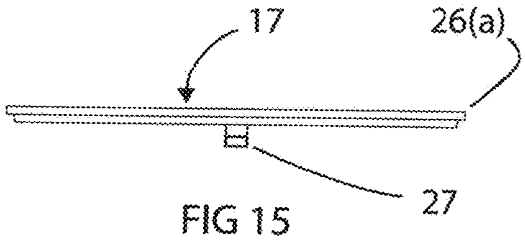

FIG. 15 is a side view of the dispenser lid 17 of FIG. 13, oriented ninety degrees, horizontally, from the view shown in FIG. 13.

FIG. 16 depicts a side view of, for exemplary purposes only, a threaded upper powder dispenser 21, further showing the latches 27 and having a powder dispenser lid 17 (out of view) attached.

FIG. 16A is a rendering of a side view, for exemplary purposes, of a typical upper powder dispenser 21.

FIG. 17 depicts a "see-through" perspective view of the manner in which three powder dispensers 21, 22, 23, may be stacked and secured, by means of their threaded 30(*a*) connectors, atop one another in a vertical sequence.

FIG. 18 presents a perspective of a typical upper powder dispenser 21, 22, 23, illustrated with a dispenser lid 17 attached thereto. The sliding hatch 29 of the powder dispenser lid 17 is in its closed position.

FIG. 19 depicts the upper powder dispenser 21 of FIG. 18, with its lid 17 removed. Displayed is a quantity of nutritional powdered formula 16 loaded within the pan 30 of the powder dispenser 21.

FIG. 20 shows a perspective view of a typical empty powder dispenser 21, 22, 23. Further shown is one of two slots 27(*a*) which serve to accommodate the latch (es) 27 of the dispenser lid 17.

Figure 21:
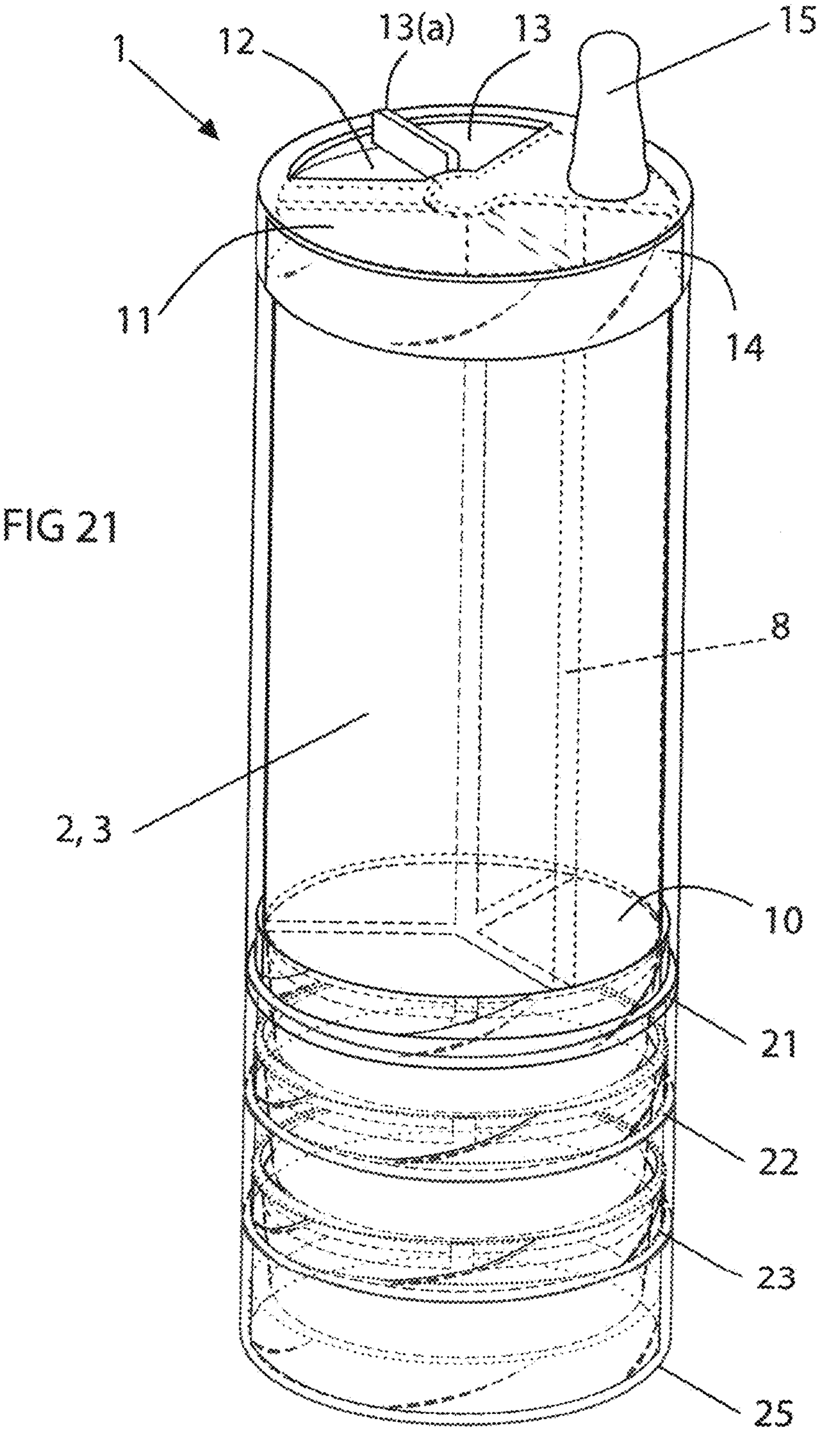

FIG. 21 illustrates a perspective, "see-through" view of a fully assembled EZ Bottle 1, configured with the attachment of three powder dispensers 21, 22, 23

| Table of Nomenclature & Part Numbers of Invention |
|---|
| 1. EZ Bottle |
| 2. Cylinder main body |
| 3. Cylinder exterior |
| 4. Cylinder interior |
| 5. First chamber |
| 6. Second chamber |
| 7. Third chamber |
| 8. Divider |
| 9. n/a |
| 10. Floor |
| 11. Canister top |
| 12. Loading portal |
| 13. Shutter |
| 13(a) Shutter ridge |
| 14. Rim |
| 15. Nipple |
| 16. Powdered formula |
| 17. Powder dispenser lid |
| 18. Dispenser outer surface |
| 19. Dispenser inner surface |
| 20. T/B/D |
| 21. Upper powder dispenser |
| 22. Center powder dispenser |
| 23. Lower powder dispenser |
| 24. Spout |
| 25. Cuff |
| 26. Upper surface |
| 26(a) Rim |
| 27. L-shaped latch |
| 27(a) Slot |
| 27(b) Flange |
| 28. Lid |
| 29. Sliding hatch |
| 30. Pars |
| 30(a) Threads |

DETAILED DESCRIPTION OF THE INVENTION

The objects, features, and advantages of the inventive concept presented in this application are more readily understood when referring to the accompanying drawings. The drawings, totaling twenty-one (21) figures, show the basic components and functions of embodiments and/or methods of use. In the several figures, like reference numbers are used in each figure to correspond to the same component as may be depicted in other figures.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
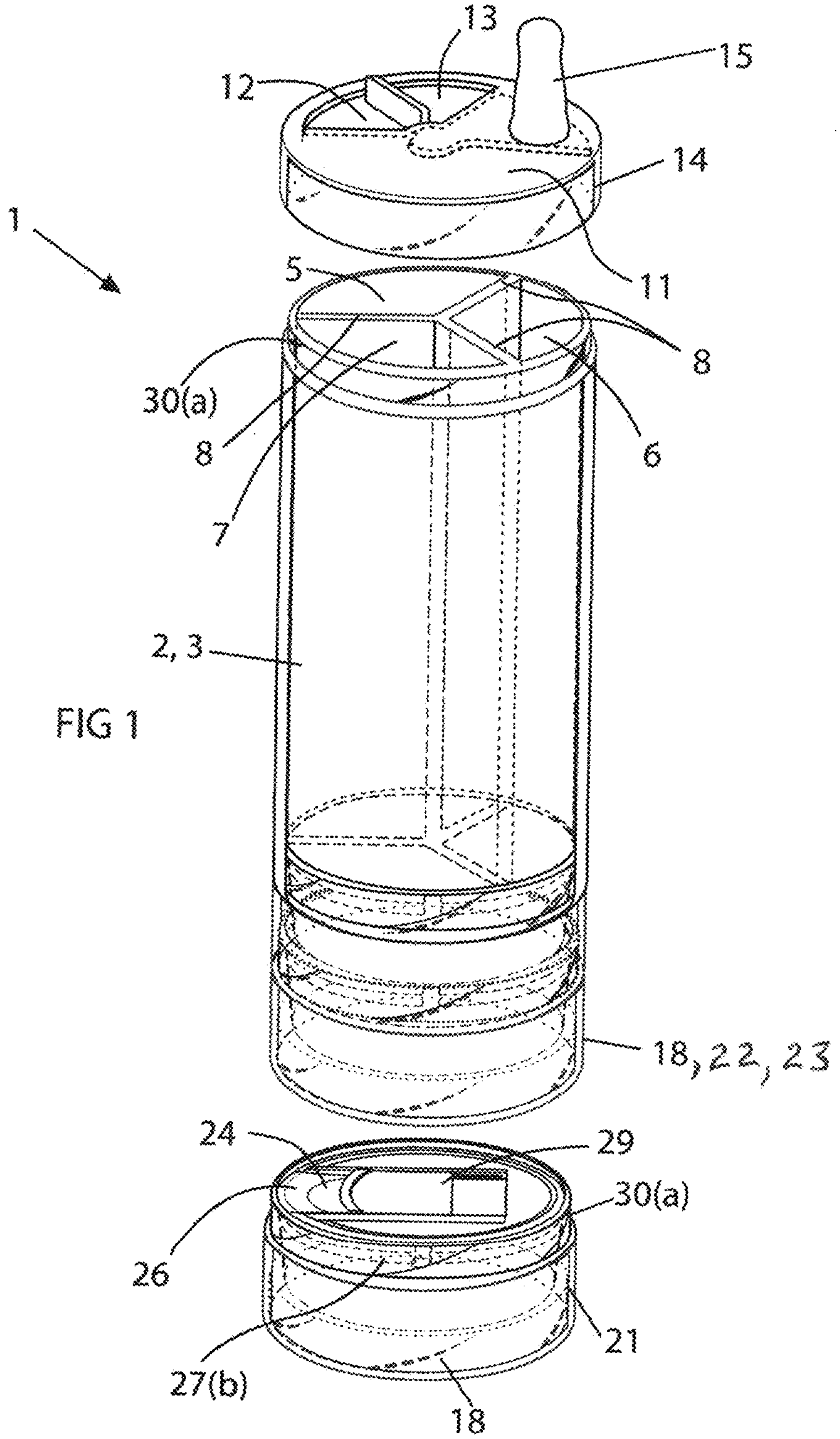

The discussion of the present inventive concept will be initiated with FIG. 1. Displayed in FIG. 1 is an exploded, "see-through" view of the preferred embodiment of the device, which is referred to as the "EZ Bottle" 1. In the upper segment of FIG. 1 there is displayed a detached canister top 11. The canister top 11 shown in FIG. 1 displays a contoured opening, termed a "loading portal" 12. The loading portal 12 is shown partially covered by a slidable planar shutter 13. The loading portal 12 is constructed as a sector having an exact contour corresponding to any of the respective openings of the three "chambers" 5, 6, 7 in a cylinder main body 2. The chambers 5, 6, 7 are also readily shown in FIG. 7. In the preferred embodiment, the canister top 11 manifests internal threads 30(*a*) about the inner circumference of the rim 14 of the canister top 11.

In viewing FIG. 1, it is pointed out that any of several methods of attaching the canister top 11 to the cylinder main body 2 may be utilized, included, but not limited to, compatible threaded protrusions on both items, slanted protruding ridges, close-fit snap tolerance, matching coordinated slots and latches, or other means. This notation also applies to the methods of attaching the powder dispensers 21, 22, 23 to each other and/or to the interior of a cuff 25 of the cylinder main body 2. In the preferred embodiment, when threaded segments are described or illustrated, the threaded segments comprise widely-spaced, angled threads 30(*a*) of a certain pitch on all corresponding connectable components.

A horizontally rotatable, planar shutter 13 is constructed directly underneath the upper surface of the canister top 11, and may be variably positioned in a plane parallel to the canister top 11. In this manner, closing the shutter 13 provides a barrier against the spillage of any substances through the loading portal 12 of the canister top 11. Upon a user rotating the shutter 13 counter-clockwise, the shutter 13 is placed out of view, underneath a portion of the upper surface of the canister top 11. A nipple 15 is also affixed to the upper surface of the canister top 11. The nipple 15 is constructed off-center of the canister 11 so as to enhance the flow of liquid into the mouth of an infant using the EZ Bottle 1 as a feeding method.

The center segment of FIG. 1 displays the cylinder main body 2, featuring three symmetrically spaced longitudinal dividers 8. The dividers 8 separate the cylinder main body 2 into three discrete lengthwise chambers, being a first chamber 5, a second chamber 6, and a third chamber 7. When in use, a person grasps the exterior 3 of the cylinder main bottle 2 then rotates the canister top 11 so as to align the contour of the loading portal 12 with one of the three chambers 5, 6, 7 of the cylinder main body 2. At this point, the shutter 13 may be slidingly positioned so as to fully open the loading portal 12, thereby permitting a liquid, powder, or other substance to be poured into the selected chamber 5, 6, 7.

FIG. 1 also displays, in the center segment of the drawing, the outer surfaces 18 of two powder dispensers 22, 23, being attached to the lower portion of the cylinder main body 2. In the lower portion of FIG. 1, there is shown an exemplary, stand-alone powder dispenser 21, directly below the cylinder main body 2. It is to be noted that the two attached powder dispensers 22, 23 are both stacked and attached successively, to each other, and to the bottom of the cylinder main body 2. All three powder dispensers 21, 22, 23 are of the exact same construction and dimensions. In the preferred embodiment, an upper powder dispenser 21, center powder dispenser 22, and lower powder dispenser 23 may be concentrically stacked vertically and securely attached to each other and to the cylinder main body 2.

FIG. 2 is an illustration of the canister top 11 as previously shown in FIG. 1. Further shown is the rim 14 of the canister top 11 and an integral nipple 15. In the preferred embodiment, the inner surface of the rim 14 is be constructed with threads 30(*a*) compatible with similar threads placed exteriorly to the top of the cylinder main bottle 2. In FIG. 2, the shutter 13 is shown partly open, having been moved to that position by means of a shutter ridge 13(*a*), thereby exposing the loading portal 12.

FIG. 3 is a side view of the canister top 11, with dashed lines indicating the placement of threads 30(*a*) interiorly to the rim 14 of the canister top 11. The threads illustrated are compatible with the same threads 30(*a*) constructed on the outer topmost portion of a cylinder main body 2. Also shown is the shutter ridge 13(*a*), constructed orthogonally to the shutter 13, enabling a user to slidingly position the shutter 13.

FIG. 4 presents a top view of the canister top 11. The shutter 13 is shown, having been slidingly moved to a fully closed position, so as to secure the contents of any of the three chambers 5, 6, 7, that may be positioned directly underneath the loading portal 12. The loading portal 12 is correspondingly out of view.

FIG. 5 shows a top view of the canister top 11. The shutter ridge 13(*a*) has been slidingly moved to the open position, so as to expose the entirety of the loading portal 12. This enables the insertion of powdered formula 16 or any type of powder or liquid substance through the loading portal 12 into the first, second, or third chamber 5, 6, 7, whichever chamber 5, 6, 7, is exposed by the shutter 13.

FIG. 6 is a top view of an embodiment of the cylinder main body 2, further showing three symmetrically spaced, longitudinally-extending dividers 8. The dividers 8 separate the cylinder main body 2 into three discrete lengthwise containers, being a first chamber 5, a second chamber 6, and a third chamber 7. The floor 10 of each chamber 5, 6, 7 is also visible. FIG. 6 also displays a section line, A-A, to facilitate further description of the cylinder main body 2.

FIG. 7 is a cross-sectional view of the full length of the cylinder main body 2, in accordance with the line-of-sight shown by the arrows of section line A-A of FIG. 6. Further shown in FIG. 7 are two of the dividers 8 which form the third chamber 7 and the second chamber 6. The interior surface 4 of the cylinder main bottle 2 is also partially visible. Each chamber 5, 6, 7 has its own integral floor 10, thus providing a fully-sealed compartment for the stowage of any liquid placed therein, upon closing and sealing of the canister top 11.

In FIG. 7, it is to be noted that threads 30(*a*) are constructed on the interior circumference of a cuff 25, the cuff 25 defining the bottom of the cylinder main body 2. The interior threads 30(*a*) permit the attachment of a powder dispenser 21, 22, 23, having compatible threads 30(*a*) onto the cylinder main body 2.

FIG. 8 is another top view of the cylinder main body 2, further showing the exterior surface 3, three dividers 8, and threads 30(*a*) around the circumferential top of the cylinder main body 2. Further shown are the first chamber 5, the second chamber 6, and the third chamber 7

FIG. 9 is a perspective, "see-through" view of the cylinder main body 2, showing its exterior surface 3, the first chamber 5, second chamber 6, and third chamber 7. It is to be noted that circumferential threads 30(*a*) at the top edge of the cylinder main body 2 enable the secure fastening of the canister top 11 to the cylinder main body 2.

FIG. 10 illustrates a view of the outer surface 18 of a planar powder dispenser lid 17, which is an attachable component of each the upper powder dispenser 21, the center powder dispenser 22, and the lower powder dispenser 23. The operation of the EZ Bottle 1 is facilitated by the connection of any or all of the powder dispensers 21, 22, 23 to the bottommost section of the cylinder main body 2. The powder dispensers 21, 22, 23, must have the lid 17 secure attached prior to use with the EZ Bottle 1. The powder dispensers 21, 22, 23 are more readily understood by referring to FIGS. 18, 19, and 20.

Further shown in FIG. 10 is a sliding hatch 29, which functions in conjunction with an immovable, permanently attached lid cover 28. The sliding hatch 29 places the dispenser lid 17 in a closed or open configuration, which is attained by the sliding hatch 29 being moved parallel, and in close proximity to, the lid cover 28. The sliding hatch 29 is shown in its closed position, the hatch 29 being on a slightly higher horizontal plane, and parallel to the fixed planar lid cover 28.

A main objective of the powder dispensers 21, 22, 23 is to permit the stowage of a quantity of nutritional powdered formula 16 or other substance within one or more of the powder dispensers 21, 22, 23. Notably, in FIG. 10, there is indicated, by dashed lines, two latches 27 which are utilized for securing the dispenser lid 17 onto any of the selected powder dispensers 21, 22, 23. This securement enables a user to transport different types or quantities of readily mixable nutrition formula, and eliminating the risk of accidental spills.

FIG. 11 illustrates the outer surface of the powder dispenser lid 17, with the sliding hatch 29 atop the lid 17 having been moved horizontally, thereby exposing a dispenser pour spout 24 in the open configuration. The open condition is attained by the sliding hatch 29 being moved parallel to, and directly atop the formerly visible lid cover 28. The lid 17 rim 26(*a*) is visible, and further sill be placed in abutment to the bottom of the cylinder main body 2 during a user's assembling of the complete EZ Bottle 1.

FIG. 12 depicts an upward-looking perspective view of the undersurface of the powder dispenser lid 17 of FIG. 11. The sliding hatch 29 has been opened, which renders the spout 24 in its open position. Further shown in FIG. 12 are two oppositely-spaced latches 27 which serve to engage circumferentially-opposed slots 27(*a*) constructed on the inner surface of each of the powder dispensers 21, 22, 23.

As further clarification of the operation of the latches 27, there is shown in FIG. 20 the position of one of the aforementioned slots 27(*a*) within a lower powder dispenser 23. The slots 27(*a*) are formed by gaps in a circumferential flange 27(*b*) interiorly to the powder dispenser 23. Upon a user engaging the latches 27 with the slots 27(*a*), the dispenser lid 17 is then depressed slightly and rotated horizontally, thus engaging each latch 27 against the undersurface of the flange 27(*b*).

FIG. 13 is a side-looking view of the powder dispenser lid 17 of FIG. 12, further showing the oppositely-spaced latches 27.

FIG. 14 presents a perspective view of the outer surface of the powder dispenser lid of FIG. 11, showing the sliding hatch 29 in the open position, rendering the powder dispenser spout 24 visible. When the spout 24 is opened, a user may pour the contents of the powder dispenser 21, 22, 23 into any of the three chambers 5, 6, 7 of the cylinder main body 2.

FIG. 15 is a side-looking view of the dispenser lid 17 of FIG. 13, oriented ninety degrees, horizontally, from the view shown in FIG. 13. For the sake of convenience, a user may easily remove the lid 17 for the purpose of inserting powdered formula 16, or other substance, into a powder dispenser 21, 22, 23.

FIG. 16 depicts a side view, for exemplary purposes, of a typical powder dispenser 21. The powder dispenser 21 is constructed with exterior threads 30(*a*) circumferentially to its upper edge, which correspond to threads 30(*a*) located on the interior cuff 25 of the cylinder main bottle 2, and likewise, correspond to identical threads 30(*a*) on the bottom inner surface 19 of all powder dispensers 21, 22, 23. Further, the powder dispenser 21 is shown to be constructed, essentially as a pan 30 with an arrangement of threads 30(*a*) exteriorly to the upper outer surface 18 of the pan 30. Further shown is a rectangular slot 27 integral to an internal circumferential flange 27(*b*) interior to the pan 30 of the powder dispenser 21.

FIG. 16A is a rendering of a side view, for exemplary purposes, of the upper powder dispenser 21, further showing a powder dispenser lid 17 attached thereto. This view is oriented 180 degrees from the view shown in FIG. 16, thereby showing a latch 27 fitted into a corresponding slot 27(*a*) within the circumferential flange 27(*b*) interior to the upper powder dispenser 21.

FIG. 17 depicts a "see-through" perspective view of three powder dispensers 21, 22, 23 attached in a stacked manner, by means of the three powder dispensers 21, 22, 23, being secured by the mutual adjoining of their respective upper outer circumferential threads 30(*a*) and their lower inner circumferential threads 30(*a*). Further shown is the cuff 25 of the outer surface 18 of the bottommost segment of the cylinder main body 2.

In FIGS. 18, 19, and 20, there are illustrated a series of drawings of an exemplary upper powder dispenser 21, which is atypical of each of the powder dispensers 21, 22, 23 that may be used with the EZ Bottle 1.

A perspective of a typical upper powder dispenser 21, 22, 23, is illustrated in FIG. 18, along with a dispenser lid 17 attached thereto. The sliding hatch 29 of the powder dispenser lid 17 is in its closed position. In operational use of the EZ Bottle 1, a user begins by loading one or more of the powder dispensers 21, 22, 23 with powdered baby formula 16 or other granular substance.

FIG. 19 depicts the exemplary powder dispenser 21 of FIG. 18, after removal of the powder dispenser lid 17, and having a quantity of nutritional powdered formula 16 loaded within the pan 30 of the powder dispenser 21.

FIG. 20 shows a perspective view of an empty powder dispenser 21, 22, 23. Further shown is one of two slots 27(*a*) which serve to accommodate the latch (es) 27 of the dispenser lid 17. The user, likely an infant's mother, will pour a measured quantity of powdered formula 16 into the pan 30 of the upper powder dispenser 21, as was shown in FIG. 19. The lid 17 of the upper powder dispenser 21 will then be tightly installed onto the top of the pan 30, as illustrated in FIG. 18. As explained priorly, integral to the lid 17 is a spout 24 which, in its open position, allows transfer of the powdered formula 16 contents from the powder dispenser 21 into the chambers of a cylinder main bottle 2.

In viewing FIG. 21, there is illustrated a perspective, "see-through" view of a fully assembled EZ Bottle 1, configured by a user, with the attachment of three powder dispensers 21, 22, 23. It is to be noted that the powder dispensers 21, 22, 23 are constructed with outer circumferences and diameters matching that of the cylinder main bottle 2. The EZ Bottle 1 is loaded with the desired number of powder dispensers 21, 22, 23, all sequentially attached to the bottom of the cylinder main body 2.

While preferred embodiments of the present inventive method have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, as described by the scope of the claims presented herein.

What is claimed is:

1. A compartmentalized nursing bottle, comprising:

(a) a cylinder main body having three discrete, lengthwise interior chambers, wherein the top exterior circumference of the cylinder main body is fabricated with a specific type and pitch of thread, and (ii) the bottom of the cylinder main is fabricated as a circumferential cuff haying interiorly, the same specific type and pitch of thread;

(b) a removable canister top having (i) an interior circumference corresponding to the top exterior circumference of the cylinder main body, to the interior circumference fabricated with the same type and pitch of thread as the top exterior circumference of the cylinder main body, (iii) an off-center nipple, and (iv) a loading portal which is opened and closed by means of a planar shutter;

(c), three cup-like powder dispensers, each having (i La removable circular lid having an upper external circumference corresponding to the internal circumference of the cuff of the cylinder main bottle and also having the same type and pitch of thread;(ii) lower interior circumference corresponding to the top exterior circumference of the cylinder main body and fabricated with the same type and pitch of thread, and (iii) a sliding hatch atop the circular lid, been horizontally positionable to an open or closed position, wherein, (d) a concentric, vertical stacking of the powder dispensers arranged by sequentially joining the exterior and interior threading common to each dispenser, with the uppermost dispenser attached to the bottom of the cylinder main body.

2. A compartmentalized nursing bottle, comprising:

(a) a cylinder main body having three discrete, lengthwise interior chambers, wherein (i) the top exterior circumference of the cylinder main body is fabricated with a specific type and pitch of thread, and (ii) the bottom of the cylinder main is fabricated as a circumferential cuff having interiorly, the same specific type and pitch of thread, (b) a removable canister top having (i an interior circumference corresponding to the top exterior circumference of the cylinder main bed (ii) the interior circumference fabricated with the same type and pitch of thread as the top exterior circumference of the cylinder main body, (iii) an off-center nipple, and (iv) a loading portal which is opened and closed by means of a planar shutter;

(c) three cup-like powder dispensers, each comprising a) a removable circular lid having an external circumference corresponding to the circumference of the powder dispenser, (ii) a sliding hatch atop the circular lid, being horizontally positionable to an open or closed position, (iii) an inner circumferential flange having two slots proximate the top inner perimeter of the powder dispenser, (iv) two L-shaped latches affixed to the undersurface of the lid, whereupon horizontal rotation of the lid causes the L-shaped latches to mutually engage the two slots, securing the lid to the dispenser; wherein (d) a concentric, vertical stacking of the powder dispensers, arranged by sequentially joining the exterior and interior threading common to each dispenser, with the uppermost dispenser attached to the bottom of the cylinder main body.

* * * * *